(12) United States Patent
Shetty et al.

(10) Patent No.: US 11,396,795 B2
(45) Date of Patent: Jul. 26, 2022

(54) FRACTURE NETWORK FLUID FLOW SIMULATION WITH ENHANCED FLUID-SOLID INTERACTION FORCE DETERMINATION

(71) Applicant: Halliburton Energy Services, Inc., Houston, TX (US)

(72) Inventors: Dinesh Ananda Shetty, Sugarland, TX (US); Avi Lin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 856 days.

(21) Appl. No.: 15/779,003

(22) PCT Filed: Mar. 11, 2016

(86) PCT No.: PCT/US2016/022147
§ 371 (c)(1),
(2) Date: May 24, 2018

(87) PCT Pub. No.: WO2017/155548
PCT Pub. Date: Sep. 14, 2017

(65) Prior Publication Data
US 2018/0371874 A1    Dec. 27, 2018

(51) Int. Cl.
*E21B 41/00*    (2006.01)
*E21B 43/26*    (2006.01)
(Continued)

(52) U.S. Cl.
CPC ......... *E21B 41/0092* (2013.01); *E21B 43/26* (2013.01); *E21B 47/06* (2013.01);
(Continued)

(58) Field of Classification Search
CPC ...... E21B 41/0092; E21B 43/26; E21B 47/06; E21B 49/00; E21B 49/08; G06F 30/20; G06F 2111/10
(Continued)

(56) References Cited

U.S. PATENT DOCUMENTS

| 6,101,444 A | 8/2000 | Stoner |
| 2010/0132946 A1* | 6/2010 | Bell .......................... F42D 1/06 166/298 |

(Continued)

FOREIGN PATENT DOCUMENTS

| WO | 2011007268 A1 | 1/2011 | |
| WO | WO-2011007268 A1 * | 1/2011 | ............. E21B 47/10 |

(Continued)

OTHER PUBLICATIONS

Fu et al, "Fully coupled geomechanics and discrete flow network modeling of hydraulic fracturing for geothermal applications", Jan. 20, 2011, Lawrence Livermore National Library (Year: 2011).*

*Primary Examiner* — Iftekhar A Khan
(74) *Attorney, Agent, or Firm* — John W. Wustenberg; Parker Justiss, P.C.

(57) ABSTRACT

An illustrative hydraulic fracturing flow simulation method includes: identifying a network of fractures within a formation rock matrix; modeling each fracture in the network as fluid flow path having discrete points at which a fluid pressure is determined; representing the rock matrix with discrete nodes at which a fluid-solid interaction force is determined, each said discrete node being associated with multiple discrete points along a fluid flow path; deriving the fluid-solid interaction force for each node from the fluid pressure at the associated discrete points; estimating an extent of fracture propagation based in part on the fluid-solid interaction forces; and displaying a visual representation of the fracture propagation extent. The deriving includes:

(Continued)

obtaining an analytic integral of the fluid pressure as modified by a weighting function for each interval between adjacent ones of the associated discrete points; evaluating the analytic integrals for each interval to obtain contributions; and summing the contributions.

23 Claims, 3 Drawing Sheets

(51) Int. Cl.
*G06F 30/20* (2020.01)
*E21B 47/06* (2012.01)
*E21B 49/00* (2006.01)
*E21B 49/08* (2006.01)
*G06F 111/10* (2020.01)

(52) U.S. Cl.
CPC .............. *E21B 49/00* (2013.01); *E21B 49/08* (2013.01); *G06F 30/20* (2020.01); *G06F 2111/10* (2020.01)

(58) Field of Classification Search
USPC ............................................. 703/10
See application file for complete search history.

(56) References Cited

U.S. PATENT DOCUMENTS

| | | | |
|---|---|---|---|
| 2010/0224365 A1 | 9/2010 | Abad | |
| 2011/0042073 A1* | 2/2011 | Legendre | ............... E21B 49/00 166/250.01 |
| 2013/0096890 A1* | 4/2013 | Vanderheyden | ......... E21B 43/20 703/2 |
| 2014/0100786 A1* | 4/2014 | Ma | ........................... G01V 1/40 702/16 |
| 2014/0305638 A1 | 10/2014 | Kresse et al. | |
| 2015/0025858 A1* | 1/2015 | Kulkarni | ................. E21B 43/26 703/2 |
| 2015/0049585 A1* | 2/2015 | Collins | .................... G01V 1/50 367/35 |
| 2015/0051878 A1* | 2/2015 | Kulkarni | ................ E21B 43/26 703/2 |
| 2015/0055438 A1* | 2/2015 | Yan | ........................ E21B 47/00 367/73 |
| 2015/0059585 A1* | 3/2015 | Kim | ...................... A47J 31/469 99/283 |
| 2015/0066446 A1* | 3/2015 | Lin | ......................... G06F 30/23 703/2 |
| 2015/0066463 A1* | 3/2015 | Shetty | ..................... E21B 43/00 703/10 |
| 2016/0341850 A1* | 11/2016 | Lin | ......................... E21B 47/00 |
| 2018/0119541 A1* | 5/2018 | Williams | ................. G01V 1/02 |
| 2018/0203146 A1* | 7/2018 | den Boer | ............... G01V 1/307 |
| 2018/0306015 A1* | 10/2018 | Shetty | .................. G01V 99/005 |
| 2018/0320514 A1* | 11/2018 | Felkl | ....................... G01V 1/48 |

FOREIGN PATENT DOCUMENTS

| | | | | |
|---|---|---|---|---|
| WO | | 2017155548 A1 | 9/2017 | |
| WO | WO-2017155548 A1 | * | 9/2017 | ......... E21B 41/0092 |

* cited by examiner

FIG. 3
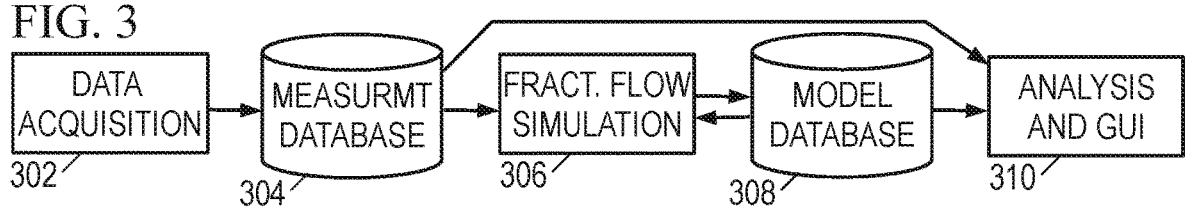
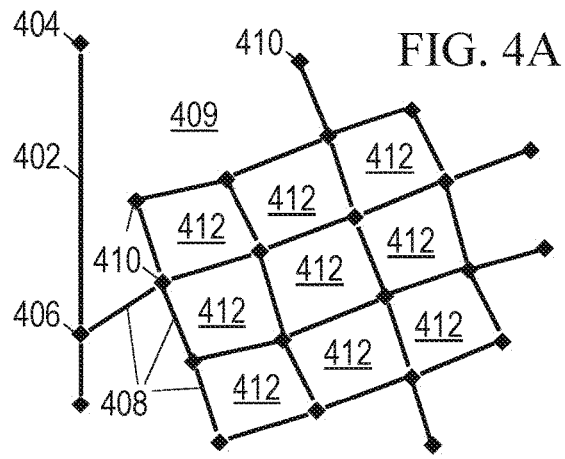
FIG. 4A
FIG. 4B
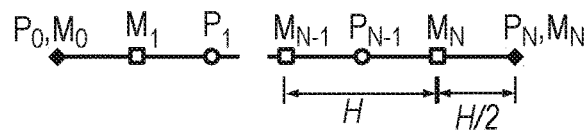
FIG. 5
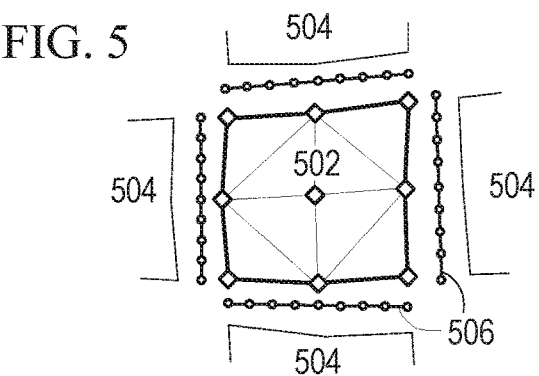

FRACTURE NETWORK FLUID FLOW SIMULATION WITH ENHANCED FLUID-SOLID INTERACTION FORCE DETERMINATION

CROSS-REFERENCE TO RELATED APPLICATION

This application is the National Stage of, and therefore claims the benefit of, International Application No. PCT/US2016/022147 filed on Mar. 11, 2016, entitled "FRACTURE NETWORK FLUID FLOW SIMULATION WITH ENHANCED FLUID-SOLID INTERACTION FORCE DETERMINATION," which was published in English under International Publication Number WO 2017/155548 on Sep. 14, 2017. The above application is commonly assigned with this National Stage application and is incorporated herein by reference in its entirety.

BACKGROUND

Unconventional reservoirs often have a low-permeability formation rock matrix that impedes fluid flow, making it difficult to extract hydrocarbons (or other fluids of interest) at commercially-feasible rates and volumes. Fortunately, the effective permeability of the formation can be increased by hydraulic fracturing. When the rock matrix is exposed to a high-pressure high-volume flow of a relatively incompressible fluid, the low permeability causes sharp gradients in the formation's stress field, forcing integrity failures at the comparatively weak points of the rock matrix. Such failures often occur as sudden "cracking" or fracturing of the matrix that momentarily reduces the stress gradient until it can be rebuilt by the intruding fluid flow. As the high-pressure flow continues, the fractures may propagate, for example, as an intermittent series of small cracks. The injected fluid also deforms and shifts blocks of matrix material, further complicating the fracture propagation analysis. As yet another complication, small grains of sand or other proppants may be added to the flow with the goal of keeping the fractures open after the fluid pressure is removed.

Accordingly, accurate modeling of the hydraulic fracturing operation requires that various fluid flow phenomena be taken into account. However, the computational resources available for modeling are typically limited and the challenge is to maximize the accuracy and efficiency of the modeling process within these constraints while ensuring that the accuracy is sufficient to guide oilfield operators. For example, inaccuracies in predicting fluid-exerted forces and the resulting formation rock matrix deformations may significantly impair the efficiency and rate at which fluids can be recovered from the formation.

BRIEF DESCRIPTION OF THE DRAWINGS

Accordingly, the drawings and the following description disclose simulation systems and methods that simulate hydraulic fracturing fluid flows with enhanced determination of fluid-solid interaction forces. Such modeling improves the accuracy with which fracture propagation and flow distributions are determined. In the drawings:

FIG. 3 is a diagram of an illustrative modeling software architecture.

FIG. 4A is a grid topology representation of an illustrative fracture network.

FIG. 4B is an illustrative one dimensional representation of a fracture.

FIG. 5 is an illustrative arrangement of flows around a rock block.

Figure 1:
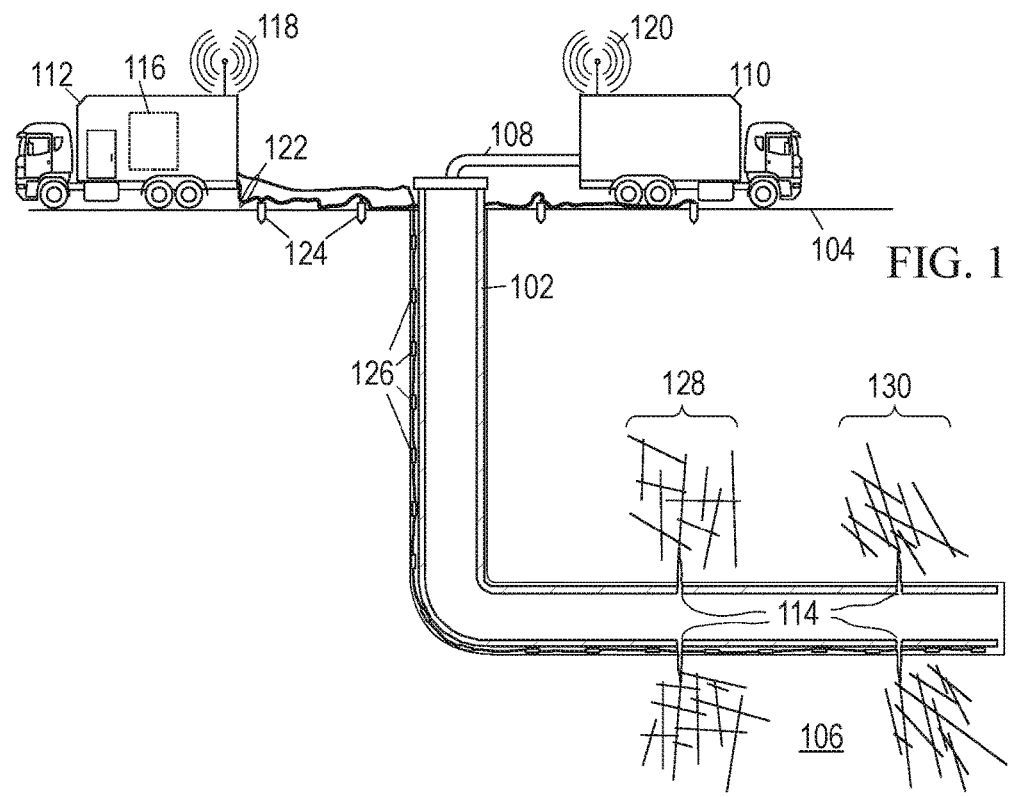
FIG. 1 is an environmental view of an illustrative hydraulic fracturing operation.

It should be understood, however, that the specific embodiments given in the drawings and detailed description do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

FIG. 1 shows the environment of an illustrative hydraulic fracturing operation. A wellbore 102 extends from the surface 104 into a subterranean region 106. Typically, the subterranean region includes a reservoir that contains hydrocarbons or other resources such as, e.g., shale, coal, sandstone, granite, or other rocks with pores containing oil or natural gas. The subterranean region 106 may include naturally fractured rock or natural rock formations that are not fractured to any significant degree. When the subterranean region 106 includes tight gas formations (i.e., natural gas trapped in low permeability rock such as shale), it is typically desirable to create additional fractures in the formation to increase the formation's effective permeability.

Accordingly, FIG. 1 also shows an injection assembly coupled to supply a high-pressure, high-volume fluid flow via a conduit 108 to the wellbore 102. The injection assembly includes one or more pump trucks 110 and instrument trucks 112 that operate to inject fluid via the conduit 108 and the wellbore 102 into the subterranean region 106, thereby opening existing fractures and creating new fractures. The fluid reaches the formation via one or more fluid injection locations 114, which in many cases are perforations in the casing of wellbore 102. Such casing may be cemented to the wall of the wellbore 102, though this is not a requirement. In some implementations, all or a portion of the wellbore 102 may be left open, i.e., without casing. The conduit 108 may include an injection manifold and feed pipe, as well as piping internal to the wellbore such as a work string, coiled tubing, sectioned pipe, or other types of conduit.

The fracture treatment may employ a single injection of fluid to one or more fluid injection locations 114, or it may employ multiple such injections, optionally with different fluids. Where multiple fluid injection locations 114 are employed, they can be stimulated concurrently or in stages. Moreover, they need not be located within the same wellbore 102, but may for example be distributed across multiple wells or multiple laterals within a well. A treatment control system 116 coordinates operation of the injection assembly components (pump trucks, feed tanks, throttles, valves, flow sensors, pressure sensors, etc.) to monitor and control the fracture treatment. Though shown as being localized to a single instrument truck 112, the control system 116 may in practice take the form of multiple data acquisition and processing systems optionally distributed throughout the injection assembly and wellbore 102, as well as remotelycoupled offsite computing facilities available via communication links and networks. Though the computing system is described below as a separate entity for implementing hydraulic fracture modeling, some contemplated embodiments of the treatment control system 116 have the simulator as an integrated component.

The pump trucks 110 can include mobile vehicles, immobile installations, skids, hoses, tubes, fluid tanks, fluid reservoirs, pumps, valves, mixers, or other types of structures and equipment. They supply treatment fluid and other materials (e.g., proppants, cross linked gels, linear gels, surfactants, breakers, stop-loss materials) for the fracture treatment. The illustrated pump trucks 110 communicate treatment fluids into the wellbore 102 at or near the level of the ground surface 104. The pump trucks 110 are coupled to valves and pump controls for starting, monitoring, stopping, increasing, decreasing or otherwise controlling pumping as well as controls for selecting or otherwise controlling fluids pumped during the treatment.

The instrument trucks 112 can include mobile vehicles, immobile installations, or other suitable structures and sensors for measuring temperatures, pressures, flow rates, and other treatment and production parameters. The example instrument trucks 112 shown in FIG. 1 include an treatment control system 116 that controls or monitors the fracture treatment applied by the injection assembly. The injection assembly may inject fluid into the formation above, at, or below a fracture initiation pressure; above, at, or below a fracture closure pressure; or at another fluid pressure.

Communication links 118, 120 enable the instrument trucks 112 to communicate with the pump trucks 110 and other equipment at the ground surface 104. Additional communication links 122 enable the instrument trucks 112 to communicate with sensors or data collection apparatus in the wellbore 102, other wellbores, remote facilities, and other devices and equipment. The communication links can include wired or wireless communications assemblies, or a combination thereof. FIG. 1 shows communication links 122 for an array of surface seismic sensors 124 and an array of downhole seismic sensors 126 for detecting and locating microseismic events. Though downhole sensors 126 are shown as being positioned in the injection well, they can also or alternatively be located in one or more nearby monitoring wells. Sensors 124 and/or 126 detect seismic energy from the microseismic events that occur as fractures are formed and propagated. The received energy signals from the sensors are processed by the control system 116 to determine the microseismic event locations, times, and magnitudes. Such information is indicative of the fracture locations and dimensions, which information may be used to determine when the fracturing operations should be terminated and how to carry out subsequent operations to achieve the desired results.

The treatment control system 116 may include data processing equipment, communication equipment, and other equipment for monitoring and controlling injection treatments applied to the subterranean region 106 through the wellbore 102. The treatment control system 116 may be communicably linked to a remote computing facility that can calculate, select, or optimize treatment parameters for initiating, opening, extending, and conveying proppant into fractures. The treatment control system 116 may receive, generate or modify an fracture treatment plan (e.g., a pumping schedule) that specifies properties of an fracture treatment to be applied to the subterranean region 106. Based on such modeled behavior results, the treatment control system 116 shown in FIG. 1 controls operation of the injection assembly to optimize fluid compositions, flow rates, total flow volumes, injection pressure, and shut-in intervals.

FIG. 1 shows that an treatment has fractured the subterranean region 106, producing first and second fracture families 128, 130 from respective perforations 114. The induced fractures may extend through naturally fractured rock, regions of un-fractured rock, or both. The injected fracturing fluid can flow from the induced fractures into the natural fracture networks, into the rock matrix, or into other locations in the subterranean region 106 (e.g., faults, voids). The injected fracturing fluid can, in some instances, dilate or propagate the natural fractures or other pre-existing fractures in the rock formation. The formation and propagation of fractures produces microseismic events, which may be identified and located based on analysis of the signals from sensors 124 and 126. The progression of the fracturing operation can thus be monitored and such monitoring used to derive information useful for modeling the fracture networks that have been formed and which may be formed in future fracturing operations in the region.

In some implementations, the control system 116 collects and analyzes the signals from sensors 124, 126 to map fractures, monitor the spatial distribution of injected fluids, and to control the fluid injection parameters to optimize the modification of effective formation permeability. For example, the treatment control system 116 can modify, update, or generate a fracture treatment plan (pumping rates, pressures, volumes, fluid compositions, and timing) based on the estimated spatial distributions of various fluid components (optionally derived from tiltmeter and microseismic monitoring of the ongoing treatment). As another example, fracture flow parameters derived from previous fracturing operations may enable predictions of fracture flow properties based on a proposed pumping schedule or other aspects of a formation treatment plan for subsequent operations in the field.

Some of the techniques and operations described herein may be implemented by one or more computing assemblies configured to provide the functionality described. In various instances, a computing assembly may include any of various types of devices, including, but not limited to, handheld mobile devices, tablets, notebooks, laptops, desktop computers, workstations, mainframes, distributed computing networks, and virtual (cloud) computing systems.

Figure 2:
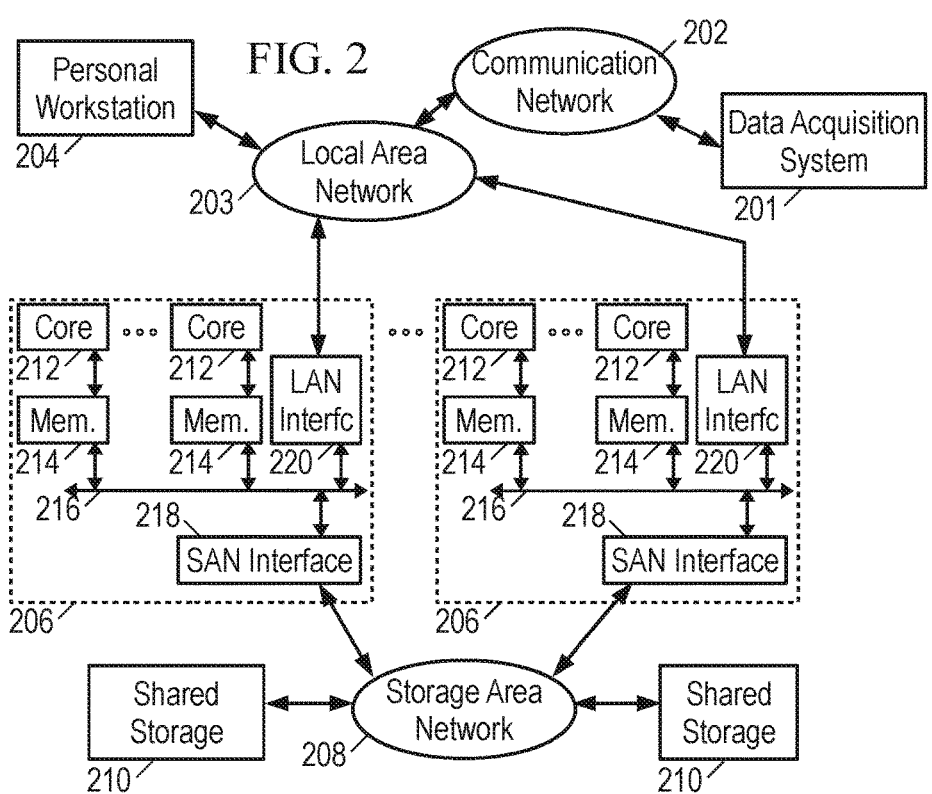
FIG. 2 is a block diagram of an illustrative hydraulic fracture modeling system.

FIG. 2 shows an illustrative computing system in which a data acquisition system 201 represents the instrument trucks 112 and other sources of data regarding the well and surrounding formations. A communications network 202 (such as, e.g., the internet or other communications link for transferring digital data) couples the data acquisition system 201 to a local area network (LAN) 203 to communicate the data to a personal workstation 204. The data can include treatment program data, geological data, fracture data, fluid data, or other types of information. Workstation 204 may take the form of a desktop computer having a user interface (e.g., keyboard, mouse, and display) that enables the user to interact with the other elements of the computing system, e.g., by entering commands and viewing responses. In this fashion, the user is able to retrieve the well data and make it available for simulation of flow in a network of fractures.

Workstation 204 may lack sufficient internal resources to perform such processing in a timely fashion for complex fracture networks. The LAN 203 further couples the workstation 204 to one or more multi-processor computers 206, which are in turn coupled via a storage area network (SAN) 208 to one or more shared storage units 210. LAN 203 provides high-speed communication between multi-processor computers 206 and with personal workstation 204. The LAN 204 may take the form of an Ethernet network.

Multi-processor computer(s) 206 provide parallel processing capability to enable suitably prompt processing of the measurements and fracture modeling information to simulate fracture fluid flows. Each computer 206 includes multiple processors 212, distributed memory 214, an internal bus 216, a SAN interface 218, and a LAN interface 220. Each processor 212 operates on allocated tasks to solve a portion of the overall problem and contribute to at least a portion of the overall results. Associated with each processor 212 is a distributed memory module 214 that stores application software and a working data set for the processor's use. Internal bus 216 provides inter-processor communication and communication to the SAN or LAN networks via the corresponding interfaces 218, 220. Communication between processors in different computers 206 can be provided by LAN 204 or via a mailbox mechanism on storage devices 210.

SAN 208 provides low-latency access to shared storage devices 210. The SAN 208 may take the form of, e.g., a Fibrechannel or Infiniband network. Shared storage units 210 may be large, stand-alone information storage units that employ magnetic disk media for nonvolatile data storage. Other suitable forms of nontransitory information storage media can also be employed. To improve data access speed and reliability, the shared storage units 210 may be configured as a redundant disk array ("RAID").

It is the software that configures the various parts of the computing system to coordinate and collectively operate as a modeling and simulation system. One or more commercially available software packages and libraries may be installed in the computer assembly to provide the functionality for solving linear systems. User-authored programs, functions, scripts, workflows, or other programming mechanisms may be employed to customize the operation of the software and automate certain operations such as those outlined below for formulating reservoir formation models and simulating fluid flows and fracture propagation. The applications software may include a formation modeling module, a fracture mapping module, an equation construction module, an equation solving module, a user interface module, and other function modules, each implemented in the form of machine-readable instructions. Examples of commercially available software that support the use of such programming include C, C++, C++ AMP, D, Erlang, Python, and Fortran. The computing system can be pre-programmed, or can be programmed (and reprogrammed), by loading a program from another source (e.g., from a CD-ROM or other nontransient information storage medium, from another computer device through a data network, or in another manner). Nevertheless, the implementation of the following methods is not limited to any specific software language or execution environment.

The software operating on the computing system may be structured as indicated by the software architecture shown in FIG. 3. A data acquisition module 302 stores various types of data in a measurement database 304. The measurement database may include treatment program information such as a pumping schedule, flow rates, flow volumes, slurry concentrations, fluid compositions, injection locations, shut-in times, or other parameters. The measurement database may further include geological data relating to geological properties of a subterranean region. For example, the geological data may include information on wellbores, completions, or information on other attributes of the subterranean region. In some cases, the geological data includes information on the lithology, fluid content, stress profile (e.g., stress anisotropy, maximum and minimum horizontal stresses), pressure profile, spatial extent, natural fracture geometries, or other attributes of one or more rock formations in the subterranean zone. The geological data can include information collected from well logs, rock samples, outcroppings, microseismic imaging, tilt measurements, or other data sources.

The measurement database may still further include fluid data relating to well fluids and entrained materials. The fluid data may identify types of fluids, fluid properties, thermodynamic conditions, and other information related to well assembly fluids. The fluid data can include flow models for compressible or incompressible fluid flow. For example, the fluid data can include coefficients for systems of governing equations (e.g., Navier-Stokes equations, advection-diffusion equations, continuity equations, etc.) that represent fluid flow generally or fluid flow under certain types of conditions. In some cases, the governing flow equations define a nonlinear system of equations. The fluid data can include data related to native fluids that naturally reside in a subterranean region, treatment fluids to be injected into the subterranean region, hydraulic fluids that operate well assembly tools, or other fluids that may or may not be related to a well assembly.

Simulation software 306 (including the fracture mapping, spatial discretization, equation construction, and solving modules, collectively termed the processing module) employs the information from the measurement database 304 to locate and model the flow of fluids along hydraulically induced fractures. The fracture and fluid properties are stored in model database 308. The fracture and fluid properties may include time-dependent spatial distribution of fluid flow parameters as discussed further below. A visualization and analysis module 310 generates visual representations of the fractures and flow properties for an operator, generally in an interactive form that enables the operator to enhance portions of the model and derive analytical results therefrom. The visual representation may depict spatial distributions of values and/or integrated values such as injected volumes, flow rates, fracture dimensions, and estimated permeabilities. In some contemplated embodiments, the analysis module further produces recommendations for real-time modifications to treatment plans that are underway.

We turn now to a discussion of certain fracture network modeling details. The hydraulic fracturing operations produce complex fracture networks that pose steep requirements for computationally modeling physical phenomena (such as crack propagation and fluid-structure interaction forces) to the desired accuracy. One of the challenges associated with developing computational models is discretization of the spatial domain where the computer accounts for and distinguishes between the fluid and solid regions, which vary with respect to time.

One approach disclosed by Shetty and Lin in "A Fast Parallel Coupled Hydraulic Fracture Simulator", SPE-171902-MS, 2014 ("Shetty & Lin 2014") models the fracture network using a representation similar to that shown in FIG. 4A. A borehole 402 couples a surface inlet 404 to one or more perforations 406. The borehole is modeled as a series of cylindrical segments. Fluid treatments are supplied at the surface inlet 404 and reach the fracture network via the perforation(s) 406. Each perforation 406 couples the treatment fluid flow to a network of fractures 408 extending into a reservoir 409. Junctions 410 are formed where the fractures 408 intersect or terminate. Regions enclosed by the fractures 410 are rock matrix blocks 412. Thus, the modeled physical domain is broken into five subdomains: borehole 402, fractures 408, reservoir 409, junctions 410, and rock blocks 412. Suitable governing equations and further implementation detail is provided in Shetty & Lin 2014.

Though the fractures 408 represent three dimensional objects having a length, a height, and an aperture, the flow parameters are modeled as uniform across the height and aperture, enabling each fracture to be treated as one-dimensional as shown in FIG. 4B. (The borehole can be similarly modeled as one dimensional.) Between the two end points (junctions), the fracture is divided into discrete points at which the flow parameters (flow rate, pressure, proppant concentration, density, and viscosity) are calculated. The differential equations that govern the simulated fluid flow exhibit improved numerical stability when the points at which the flow rate is calculated are offset from the remaining parameters. Accordingly, the points labeled $M_i$ are the ith point at which the mass flow rate is determined, and the points labeled $P_i$ are the ith point at which the pressure and the other fluid parameters are determined. (At the junctions, all parameter types are determined.) Each pair of points $M_i$, $P_i$, may represent the control volume having a length of H, with the points labeled $P_i$ representing the parameter values within a control volume and the points labeled $M_i$ located midway between the pressure points to represent the mass flow rate between control volumes.

As discussed by Shetty & Lin 2014, the fractures and junctions are coupled to the rock blocks, causing the rock blocks to deform and displace in based in part on the forces exerted by the fluid flow. FIG. 5 shows a selected rock block 502 which, together with its adjacent rock blocks 504, define fractures into and through which fluids may flow. As previously mentioned, the flow through each fracture may be modeled using a discretized one-dimensional flow path 506. (In FIG. 5, the pressure points $P_j$ are shown on these paths without the intermediate mass flow points $M_i$.)

The simulation software models each rock block as having discrete nodes (shown as diamonds) representing the corner points and intermediate key points spaced along each fracture. Edges are drawn between the discrete nodes to represent the tessellation of the rock block 502 into individually deformable units. The simulation software deforms the rock block 502 (and thereby determines displacements of each node) based in part on forces exerted by the fluids. These displacements in turn affect the aperture of the fracture and the parameters of the fluid flow.

To implement these fluid-solid interactions the simulation software may employ a matching number of rock block nodes and discrete pressure points in an aligned arrangement along the fracture. While this approach may simplify certain aspects of the model equations, it is suboptimal because the behavior of the fluid flow tends to be far more complex and necessary to analyze on a much finer scale than the behavior of the solid rock matrix. As described by Shetty and Lin in "Formation Fracture Flow Monitoring", PCT/US14/066413, filed Nov. 19, 2014 ("Shetty & Lin 2015a"), the fracture path discretization may be refined relative to the mesh discretization of the rock matrix while maintaining a correspondence that enables efficient information propagation between the two. When propagating from a finer discretization to a coarser discretization, the information propagation may include numerical integration, whereas when propagating from coarse to fine, the information propagation may include interpolation.

Figure 6:
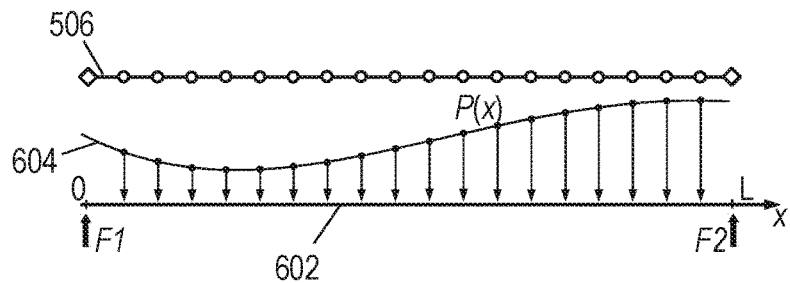
FIG. 6 is an illustrative map of pressure to interaction force.

FIG. 6 illustrates information propagation from a finely-discretized fluid flow path 506 to discrete nodes on a coarsely-discretized surface 602 of a rock block. Depending on various factors (fracture length, desired simulation granularity, truncation error) the number of discrete points along the flow path may vary from fracture to fracture. Regardless, the simulation software operates to determine from the fluid flow's distributed force on the rock block surface caused by the pressure P(x) (shown as curve 604), the corresponding node forces F1, F2. This determination performs a numerical integration of the pressure values found at the associated discrete pressure points. Such pressure values may be the result of a fluid dynamics simulation employing Navier-Stokes governing equations, Reynolds-type of governing equations or some other suitable technique. As an example, the Reynolds governing equation for one dimensional flow is:

$$A_t - \left(\frac{A^3}{12\mu} P_x\right)_x = 0 \tag{1}$$

where A is the cross sectional flow area, P is the pressure, $\mu$ is the fluid viscosity, subscript t represents a time derivative, and subscript x represents a spatial derivative. Any temporal discretization and linearization strategy for the non-linear terms, e.g., the Crank-Nicholson method, may be employed to implement flow simulation from the governing equations.

To estimate the forces F1, F2, we take one of the rock block nodes as the origin of a coordinate system having an x-axis extending through the adjacent rock block node, which is positioned a distance L from the origin. The forces F1, F2 can then be estimated using integrals along the segment between the adjacent nodes:

$$F_1 = \int_0^L \left(1 - \frac{x}{L}\right) P(x) dx \tag{2}$$

$$F_2 = \int_0^L \left(\frac{x}{L}\right) P(x) dx \tag{3}$$

where P(x) is the spatially-dependent pressure, (1−x/L) is the right half of a triangular weighting function, and (x/L) is the left half of the triangular weighting function. (Though not shown in FIG. 6, each node has a flow path segments extending in either direction, and the total force at each discrete node is the vector sum of forces from both associated segments.) Other weighting functions may also be employed. Since the pressure P(x) may be known only at discrete points $x_i$, it is preferred to solve these integrals numerically. Three approaches to this numerical integration are discussed and compared below.

The first numerical integration approach discussed here is the classical "midpoint" or "trapezoidal" method, which approximates the integrand as a linear function between each discrete point, enabling the integral to be estimated as the distance between discrete points times the average value of the integrand at those points. This approach yields the following summations:

$$F_1 = \sum_i (x_{i+1} - x_i) \frac{\left[\left(1 - \frac{x_{i+1}}{L}\right) P(x_{i+1}) + \left(1 - \frac{x_i}{L}\right) P(x_i)\right]}{2} \tag{4}$$

$$F_2 = \sum_i (x_{i+1} - x_i) \frac{\left[\left(\frac{x_{i+1}}{L}\right) P(x_{i+1}) + \left(\frac{x_i}{L}\right) P(x_i)\right]}{2} \tag{5}$$

The second numerical approach discussed here is herein termed the "shape" method. If the analytical function for the pressure P(x) is known or can be approximated as a polynomial, the direct integral of equations (2) and (3) is calculated for each interval between discrete points. For example, if the pressure function P(x) is approximated as being linear between discrete points $x_i$, and $x_{i+1}$, we have $$P|_{x_i}^{x_{i+1}} = \frac{P_{i+1} - P_i}{x_{i+1} - x_i}x + \left(P_i - \frac{P_{i+1} - P_i}{x_{i+1} - x_i}x_i\right) \quad (6a)$$

$$P|_{x_i}^{x_{i+1}} = m_i x + c_i \quad (6b)$$

Substituting into equations (2) and (3) and performing the direct integration for each of the intervals between discrete points yields:

$$F_1 = \sum_i \left(m_i \frac{x_{i+1}^2 - x_i^2}{2L} - m_i \frac{x_{i+1}^3 - x_i^3}{3L} + c_i(x_{i+1} - x_i) - c_i \frac{x_{i+1}^2 - x_i^2}{2L}\right) \quad (7)$$

$$F_2 = \sum_i \left(m_i \frac{x_{i+1}^3 - x_i^3}{3L} + c_i \frac{x_{i+1}^2 - x_i^2}{2L}\right) \quad (8)$$

This shape method is general and can account for any assumption about the shape of pressure function in the equations. In an illustrative variation on this method, the pressure function can be approximated as needed with a polynomial function of second- or higher-degree, chosen to enforce specific criteria such as limiting the error or ensuring accuracy to a specified order.

Figure 7A:
FIGS. 7A-7B show alternative discrete point distributions.
Figure 7B:

The third numerical approach discussed herein is an enhanced Gauss-Legendre quadrature method. In this method, integration is performed using the equation $$\int f \, dx = \Sigma_i w_i f_i, \quad (9)$$

where $w_i$ is a weight coefficient, and $f_i$ is the value of the integrand f at the Legendre node $x_i$. That is, rather than having the discrete points $x_i$ be evenly spaced along the flow path as shown in FIG. 7A, they are non-uniformly positioned as indicated in FIG. 7B. More specifically, the discrete points where the pressure P(x) (and the integrand f) are evaluated are positioned at the roots of a Legendre polynomial having the desired order. As further indicated in FIG. 7B, the intermediate points where the mass flow rate is determined are preferably located midway between adjacent pressure points.

Legendre polynomials of the desired order N may be determined using the three-term recurrence formula:

$$L_N(x) = \frac{(2N-1)xL_{N-1}(x) - (N-1)L_{N-2}(x)}{N};$$
with $L_1(x) = x;$
$L_0(x) = 1.$ On the interval from $-1 \le x \le 1$, the roots of the selected polynomial may be determined using Newton's method alone or in combination with Horner's method. Newton's method employs iterative solving of the equation $$x_i^{n+1} = x_i^n - \frac{L_N(x_i^n)}{L_N'(x_i^n)} \quad (11)$$

which causes the (n+1)th estimate of the root $x_i$ to converge to a zero-crossing. Horner's method may be employed to minimize the computational cost of the repeated evaluations of the Legendre polynomial and its derivative. Alternatively, the evaluations may be performed using the recurrence formula of equation (10), an approach which may be preferred for polynomials of higher order (e.g., >20) to reduce round-off errors. Once the roots of a $L_N(x)$ have been found, they may be stored in a table so that these roots need not be re-determined for other fractures requiring the same order of discretization.

The weight coefficients for equation (9) are computable as:

$$w_i = \frac{2}{(1 - x_i^2)[L_n'(x_i)]^2} \quad (12)$$

Having determined the root locations $x_i$ and the weight coefficients $w_i$ over the interval from −1 to 1, the locations and weights can be applied to any arbitrary interval a to b, (e.g., 0 to L) as follows:

$$\int_a^b f \, dx = \frac{b-a}{2} \sum_i w_i f\left(\frac{b-a}{2}x_i + \frac{b+a}{2}\right) dx \quad (13)$$

with the discrete points being shifted accordingly. As previously mentioned, the pressure function P(x) (and other flow parameters) is evaluated at the discretization points, while the mass flow rate is determined at intermediate points preferably halfway between the discretization points to maintain second order accuracy and enforce simulation stability.

Note that in adapting the Gauss-Legendre quadrature method for application in the present context at least three modifications have been disclosed. First, the Newtonian search for roots of the Legendre polynomials may switch between Horner's method and the recurrence formula for evaluating the polynomials as needed to minimize the computational cost and minimize round-off error. Second, the a table is constructed to store the roots for each given polynomial order, thereby avoiding re-determination of the roots. The table entries are for the interval from −1 to and are readily shifted to any arbitrary interval using equation (13). Third, the classic meshing technique for offsetting mass flow rate determination from pressure determination points is adapted to enable flow simulation on a non-uniform grid spacing.

We provide here a comparison of the three numerical integration approaches described above. For testing purposes, we take the pressure function to be $$P(x) = \left|\frac{2x}{L} - 1\right|^3 \quad (14)$$

over the interval with L=2. For this symmetric function, equations (2) and (3) yield $$F_1 = F_2 = \frac{L}{10} = 0.2 \qquad (15)$$

Depending on the number of discrete points associated with each node, the three numerical integration methods yield

| #Points | Classic | Shape | G-L |
|---|---|---|---|
| 3 | 0.5 | 0.333333 | 0.2 |
| 5 | 0.28125 | 0.218107 | 0.2 |
| 11 | 0.21328 | 0.206613 | 0.2 |
| 25 | 0.202313 | 0.201156 | 0.2 |

Simplifying slightly, we note that the Shape method achieves comparable accuracy to the Classic method with approximately half the resolution, while the Gauss-Legendre method is highly accurate at even low resolutions. Since the use of lower resolutions will significantly reduce computational costs of fluid flow simulations for fracture networks, the numerical integration method selected for determining the fluid-solid interaction forces can significantly enhance the performance of the simulation software and systems.

While the Gauss-Legendre numerical integration method offers high quality results for determining fluid-solid interaction forces, it should be noted that this method restricts the positioning of the discrete points along the flow path in a fashion that may not be compatible with other aspects of the simulation software. For example, where the flow path points are determined using a method for limiting truncation error in the simulation software's governing equations (e.g., as set forth by Shetty and Lin in "Generating a flow model grid based on truncation error threshold values", U.S. patent application Ser. No. 14/011,546, filed Aug. 27, 2013), it may be infeasible to restrict their positions to the root locations of a Legendre polynomial. In such circumstances, the Shape method may be used, as it can be applied to arbitrarily positioned discrete points.

As such considerations are more likely to be encountered with higher numbers of associated discrete points, some contemplated simulation system and method embodiments employ the Gauss-Legendre quadrature method for fractures having a number of discrete points below a predetermined threshold (with governing equations that can readily be solved with the desired accuracy on a non-uniform mesh), and employ the shape method for all other fractures.

Figure 8:
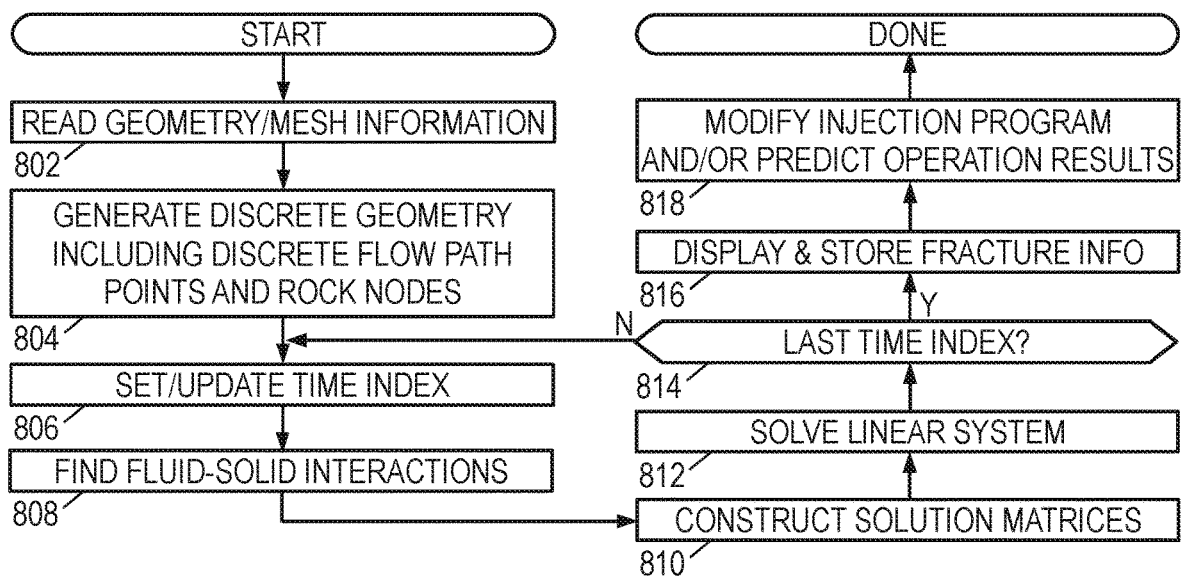
FIG. 8 is a flow diagram of an illustrative fracture flow simulation method.

In view of the foregoing principles and techniques, FIG. 8 presents an illustrative hydraulic fracture flow simulation method that may be implemented in large part by the previously described computing systems. Though the operations of the method are shown and described as being sequential, in practice some of the operations are expected to occur concurrently and with potentially different orders.

The method begins in block 802 with the simulator reading the information regarding the spatial properties of the region to be simulated, including formation layering, well positioning, fracture modeling, treatment planning, and any acquired measurements suitable for setting boundary conditions. In block 804, the simulator discretizes the volume and fracture geometry to generate a graph representation of the borehole and fracture network, with edges representing fractures, vertices representing junctions, and faces representing rock blocks within a reservoir. Discrete points along the faults and around the rock blocks are identified for calculation of flow parameters, and discrete nodes are identified for determining fluid-solid interaction forces, from which deformations and displacements of rock blocks may be derived. The simulator then initializes a time index for the flow simulation in block 806, and updates it each time the loop (blocks 806-814) is repeated. Initial values may also be set for the various node displacements and fluid flow parameters.

In block 808, the simulator calculates fluid-solid interaction forces for each matrix node abutting a fluid flow path. The simulator uses these forces, optionally in the form of displacement and/or fracture apertures, in block 810 when it constructs a set of sparse matrices representing the relationships between the system elements and expressing the subsequent state of the system in terms of the current state. Depending on the model structure, the sparse matrices may embody a connection graph in which the graph nodes may represent the discrete points along the fracture paths, discrete nodes of the formation rock matrix, and model boundaries, while the graph edges represent the interactions (multi-phase mass flows and forces) between the graph nodes. As rock blocks deform and fractures propagate, the connection graph may change, along with the various parameters representing the time-dependent state of the system, necessitating that the matrices be updated. For guidance on deriving the model and linear equations from the discretized volume and fracture network graph representation, see Bai and Lin, "Tightly coupled fluid-structure interaction computation algorithm for hydraulic fracturing simulations", 48$^{th}$ US Rock Mechanics Symposium Minneapolis, 2014 (ARMA 14-7258). Other model structures may alternatively be employed.

In block 812 the simulator solves the linear system of equations represented by the sparse matrices. The information obtained from the solution enables the simulation to determine the time-dependent spatial distribution of fluid components and flow parameters. This new distribution will be employed for simulating the next time step. In block 814, the simulator determines whether the last time step has been reached, and if not, blocks 806-814 are repeated to move the simulation forward. After completion, the time-dependent spatial distributions of fluid flow parameters and fracture geometries are stored in block 816 and optionally displayed by the visualization module. In block 818, the results are used as a basis for predicting the results of an ongoing or future fracturing program and/or modifying the fracturing program, e.g., by adjusting the injection fluid compositions, flow rates, volumes, etc. as needed to achieve the desired fracturing results.

In summary, the embodiments disclosed herein include:

A: A hydraulic fracturing flow simulation method that comprises: identifying a network of fractures within a formation rock matrix; modeling each fracture in the network as fluid flow path having discrete points at which a fluid pressure is determined; representing the rock matrix with discrete nodes at which a fluid-solid interaction force is determined, each said discrete node being associated with multiple discrete points along a fluid flow path; deriving the fluid-solid interaction force for each node from the fluid pressure at the associated discrete points; estimating an extent of fracture propagation based in part on the fluid-solid interaction forces; and displaying a visual representation of the fracture propagation extent. The deriving includes: obtaining an analytic integral of the fluid pressure as modified by a weighting function for each interval between adjacent ones of the associated discrete points; evaluating the analytic integrals for each interval to obtain contributions; and summing the contributions to obtain the fluid-solid interaction force.

B: A hydraulic fracturing flow simulation system that comprises: a data acquisition module collecting measurements from a subterranean formation; a processing module implementing a hydraulic fracturing simulation method, and a visualization module that displays a time-dependent spatial distribution. The simulation method includes: identifying a network of fractures within a formation rock matrix; modeling each fracture in the network as fluid flow path having discrete points at which a fluid pressure is determined; representing the rock matrix with discrete nodes at which a fluid-solid interaction force is determined, each said discrete node being associated with multiple discrete points along a fluid flow path; deriving the fluid-solid interaction force for each node from the fluid pressure at the associated discrete points; and estimating the time-dependent spatial distribution of fluid pressure based in part on the fluid-solid interaction forces. The deriving includes: obtaining an analytic integral of the fluid pressure as modified by a weighting function for each interval between adjacent ones of the associated discrete points; evaluating the analytic integrals for each interval to obtain contributions; and summing the contributions to obtain the fluid-solid interaction force.

C: A hydraulic fracturing flow simulation method that comprises: identifying a network of fractures within a formation rock matrix; modeling each fracture in the network as fluid flow path having discrete points at which a fluid pressure is determined; representing the rock matrix with discrete nodes at which a fluid-solid interaction force is determined, each said discrete node being associated with multiple discrete points along a fluid flow path; deriving the fluid-solid interaction force for each node from the fluid pressure at the associated discrete points; estimating an extent of fracture propagation based in part on the fluid-solid interaction forces; and displaying a visual representation of the fracture propagation extent. The deriving includes: locating said associated discrete points at positions corresponding to roots of a Legendre polynomial; calculating integrand values at said positions, the integrand being a product of a weighting function at that position with a fluid pressure at that position; and using said integrand values to form a Gauss-Legendre quadrature sum representing the fluid-solid interaction force.

D: A hydraulic fracturing flow simulation system that comprises: a data acquisition module collecting measurements from a subterranean formation; a processing module implementing a hydraulic fracturing simulation method; and a visualization module that displays a time-dependent spatial distribution. The simulation method includes: identifying a network of fractures within a formation rock matrix; modeling each fracture in the network as fluid flow path having discrete points at which a fluid pressure is determined; representing the rock matrix with discrete nodes at which a fluid-solid interaction force is determined, each said discrete node being associated with multiple discrete points along a fluid flow path; deriving the fluid-solid interaction force for each node from the fluid pressure at the associated discrete points; and estimating the time-dependent spatial distribution of fluid pressure based in part on the fluid-solid interaction forces. The deriving includes: locating said associated discrete points at positions corresponding to roots of a Legendre polynomial; calculating integrand values at said positions, the integrand being a product of a weighting function at that position with a fluid pressure at that position; and using said integrand values to form a Gauss-Legendre quadrature sum representing the fluid-solid interaction force.

Each of the embodiments A, B, C, and D, may further include one or more of the following additional features in any suitable combination: (1) the associated discrete points are positioned along a flow path between the discrete node and its adjacent discrete nodes. (2) the weighting function has a triangular profile. (3) the fluid pressure is approximated as linear over each interval. (4) the fluid pressure is approximated as a second- or higher-degree polynomial over each interval. (5) the method further comprises determining the fluid pressure at said discrete points, said determining including: obtaining a current state that include fluid pressure values at said discrete points; constructing a set of linear equations for deriving a subsequent state from the current state while accounting for fluid-solid interaction forces; repeatedly solving the set of linear equations to obtain a sequence of subsequent states, the sequence embodying a time-dependent spatial distribution of fluid pressure. (6) the method further storing the time-dependent spatial distribution on a non-transitory computer-readable medium. (7) the method further comprises modifying a fracturing program based on the time-dependent spatial distribution.

Numerous other variations and modifications will become apparent to those skilled in the art once the above disclosure is fully appreciated. The ensuing claims are intended to cover such variations where applicable.

What is claimed is:

1. A hydraulic fracturing flow simulation method that comprises:
    identifying a network of fractures within a formation rock matrix;
    modeling each fracture in the network as fluid flow path having discrete points at which a fluid pressure is determined;
    representing the formation rock matrix with discrete nodes at which a fluid-solid interaction force is determined, each said discrete node being associated with multiple discrete points along a fluid flow path;
    deriving the fluid-solid interaction force for each discrete node from the fluid pressure at the associated discrete points;
    estimating an extent of fracture propagation based in part on the fluid-solid interaction force for each discrete node;
    displaying a visual representation of the fracture propagation extent,
    wherein said deriving includes:
        obtaining an analytic integral of the fluid pressure as modified by a weighting function for each interval between adjacent ones of the associated discrete points;
        evaluating the analytic integrals for each interval to approximate fluid pressures in each interval between the adjacent ones of the associated discrete points; and
        summing the approximated fluid pressures in each interval between the adjacent ones of the associated discrete points to obtain the fluid-solid interaction force; and
    controlling a fracture treatment based on the estimated extent of the fracture propagation.

2. The method of claim 1, wherein the associated discrete points are positioned along a flow path between the discrete node and one or more adjacent discrete nodes.

3. The method of claim 1, wherein the weighting function is a triangular weighting function.

4. The method of claim 1, wherein the fluid pressure is approximated as linear over each interval.

5. The method of claim 1, wherein the fluid pressure is approximated as a second- or higher-degree polynomial over each interval.

6. The method of claim 1, further comprising determining the fluid pressure at said discrete points, said determining including:
   obtaining a current state that include fluid pressure values at said discrete points;
   constructing a set of linear equations for deriving a subsequent state from the current state while accounting for the fluid-solid interaction force at each discrete node;
   repeatedly solving the set of linear equations to obtain a sequence of subsequent states, the sequence embodying a time-dependent spatial distribution of fluid pressure.

7. The method of claim 6, further comprising storing the time-dependent spatial distribution on a non-transitory computer-readable medium.

8. The method of claim 6, further comprising modifying a fracturing program based on the time-dependent spatial distribution.

9. A hydraulic fracturing flow simulation system that comprises:
   a data acquisition system collecting measurements from a subterranean formation;
   at least one processor configured to implement hydraulic fracturing simulation method that includes:
      identifying a network of fractures within a formation rock matrix;
      modeling each fracture in the network as fluid flow path having discrete points at which a fluid pressure is determined;
      representing the formation rock matrix with discrete nodes at which a fluid-solid interaction force is determined, each said discrete node being associated with multiple discrete points along a fluid flow path;
      deriving the fluid-solid interaction force for each discrete node from the fluid pressure at the associated discrete points;
      estimating a time-dependent spatial distribution of fluid pressure based in part on the fluid-solid interaction force at each discrete node; and
      controlling a fracture treatment based on the estimated time-dependent spatial distribution of fluid pressure,
      wherein said deriving includes:
         obtaining an analytic integral of the fluid pressure as modified by a weighting function for each interval between adjacent ones of the associated discrete points;
         evaluating the analytic integrals for each interval to approximate fluid pressures in each interval between the adjacent ones of the associated discrete points; and
         summing the approximated fluid pressures in each interval between the adjacent ones of the associated discrete points to obtain the fluid-solid interaction force; and
   a display that displays the time-dependent spatial distribution.

10. The system of claim 9, wherein the weighting function is a triangular weighting function.

11. The system of claim 9, wherein the fluid pressure is approximated as linear over each interval.

12. The system of claim 9, wherein the system further comprises modifying a fracturing program based on the time-dependent spatial distribution.

13. A hydraulic fracturing flow simulation method that comprises:
   identifying a network of fractures within a formation rock matrix;
   modeling each fracture in the network as fluid flow path having discrete points at which a fluid pressure is determined;
   representing the formation rock matrix with discrete nodes at which a fluid-solid interaction force is determined, each said discrete node being associated with multiple discrete points along a fluid flow path;
   deriving the fluid-solid interaction force for each discrete node from the fluid pressure at the associated discrete points;
   estimating an extent of fracture propagation based in part on the fluid-solid interaction force for each node; and
   displaying a visual representation of the fracture propagation extent,
   wherein said deriving includes:
      locating said associated discrete points at positions corresponding to roots of a Legendre polynomial;
      calculating integrand values at said positions, the integrand being a product of a weighting function at that position with a fluid pressure at that position;
      using said integrand values to form a Gauss-Legendre quadrature sum representing the fluid-solid interaction force; and
      controlling a fracture treatment based on the estimated extent of the fracture propagation.

14. The method of claim 13, wherein said positions are between the discrete node and its adjacent discrete nodes along the flow path.

15. The method of claim 13, wherein the weighting function is a triangular weighting function.

16. The method of claim 13, further comprising determining the fluid pressure at said discrete points, said determining including:
   obtaining a current state that include fluid pressure values at said discrete points;
   constructing a set of linear equations for deriving a subsequent state from the current state while accounting for the fluid-solid interaction force at each discrete node;
   repeatedly solving the set of linear equations to obtain a sequence of subsequent states, the sequence embodying a time-dependent spatial distribution of fluid pressure.

17. The method of claim 16, further comprising storing the time-dependent spatial distribution on a non-transitory computer-readable medium.

18. The method of claim 16, further comprising modifying a fracturing program based on the time-dependent spatial distribution.

19. A hydraulic fracturing flow simulation system that comprises:
   a data acquisition system collecting measurements from a subterranean formation;
   at least one processor configured to implement a hydraulic fracturing simulation method that includes:
      identifying a network of fractures within a formation rock matrix;
      modeling each fracture in the network as fluid flow path having discrete points at which a fluid pressure is determined;
      representing the formation rock matrix with discrete nodes at which a fluid-solid interaction force is determined, each said discrete node being associated with multiple discrete points along a fluid flow path;

deriving the fluid-solid interaction force for each discrete node from the fluid pressure at the associated discrete points;
estimating a time-dependent spatial distribution of fluid pressure based in part on the fluid-solid interaction force at each discrete node; and
controlling a fracture treatment based on the estimated time-dependent spatial distribution of fluid pressure, wherein said deriving includes:
locating said associated discrete points at positions corresponding to roots of a Legendre polynomial;
calculating integrand values at said positions, the integrand being a product of a weighting function at that position with a fluid pressure at that position; and
using said integrand values to form a Gauss-Legendre quadrature sum representing the fluid-solid interaction force; and
a display that displays the time-dependent spatial distribution.

20. The system of claim 19, wherein the weighting function is a triangular weighting function.

21. The system of claim 19, further comprising determining the fluid pressure at said discrete points, said determining including:
obtaining a current state that include fluid pressure values at said discrete points;
constructing a set of linear equations for deriving a subsequent state from the current state while accounting for the fluid-solid interaction force at each discrete node;
repeatedly solving the set of linear equations to obtain a sequence of subsequent states, the sequence embodying a time-dependent spatial distribution of fluid pressure.

22. The system of claim 21, wherein the method further comprises storing the time-dependent spatial distribution on a non-transitory computer-readable medium.

23. The system of claim 21, wherein the method further comprises modifying a fracturing program based on the time-dependent spatial distribution.

* * * * *